United States Patent
Yildiz et al.

(10) Patent No.: US 11,119,650 B2
(45) Date of Patent: Sep. 14, 2021

(54) INFORMATION HANDLING SYSTEM WITH A USER DEFINED TOUCH AREA AND USER DEFINED DISPLAY AREA ON A HORIZONTAL WORK SURFACE

(71) Applicant: DELL PRODUCTS, LP, Round Rock, TX (US)

(72) Inventors: Yagiz C. Yildiz, Austin, TX (US); Jace W. Files, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 410 days.

(21) Appl. No.: 15/808,361

(22) Filed: Nov. 9, 2017

(65) Prior Publication Data

US 2019/0138203 A1    May 9, 2019

(51) Int. Cl.
*G06F 3/0488*    (2013.01)
*G06F 3/0354*    (2013.01)

(52) U.S. Cl.
CPC ...... *G06F 3/04886* (2013.01); *G06F 3/03545* (2013.01); *G06F 3/04883* (2013.01)

(58) Field of Classification Search
CPC ............. G06F 16/9535; G06F 3/04886; G06F 3/03545; G06F 3/04883

USPC .................................................. 715/757, 715
See application file for complete search history.

(56) References Cited

U.S. PATENT DOCUMENTS

| | | | |
|---|---|---|---|
| 9,001,149 B2* | 4/2015 | Sirpal | G06F 1/1616 345/619 |
| 9,557,861 B2* | 1/2017 | Park | G06F 3/044 |
| 10,437,378 B2* | 10/2019 | Jang | H04N 21/42224 |
| 2011/0246952 A1 | 10/2011 | Tsao | |
| 2012/0096350 A1 | 4/2012 | Chu et al. | |
| 2012/0311475 A1* | 12/2012 | Wong | G06F 11/3003 715/772 |
| 2014/0096046 A1* | 4/2014 | Zhong | G06F 16/9535 715/765 |

FOREIGN PATENT DOCUMENTS

CN    102207783 A    10/2011

* cited by examiner

*Primary Examiner* — Cao H Nguyen
(74) *Attorney, Agent, or Firm* — Larson Newman, LLP

(57) ABSTRACT

A memory stores a display area and a workspace area of a screen of an information handling system. A processor receives a selection of user defined workspace area option, enters into a user define workspace mode, receives a desired workspace area, and updates the workspace area in the memory from a predefined workspace area to the desired workspace area.

17 Claims, 7 Drawing Sheets

INFORMATION HANDLING SYSTEM WITH A USER DEFINED TOUCH AREA AND USER DEFINED DISPLAY AREA ON A HORIZONTAL WORK SURFACE

FIELD OF THE DISCLOSURE

The present disclosure generally relates to information handling systems, and more particularly relates to an information handling system with a user defined input area and a user defined display area on a horizontal work surface.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory that may store a display area and a workspace area of a screen of the information handling system. A processor may receive a selection of user defined workspace area option, may enter into a user define workspace mode, may receive a desired workspace area, and may update the workspace area in the memory from a predefined workspace area to the desired workspace area.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
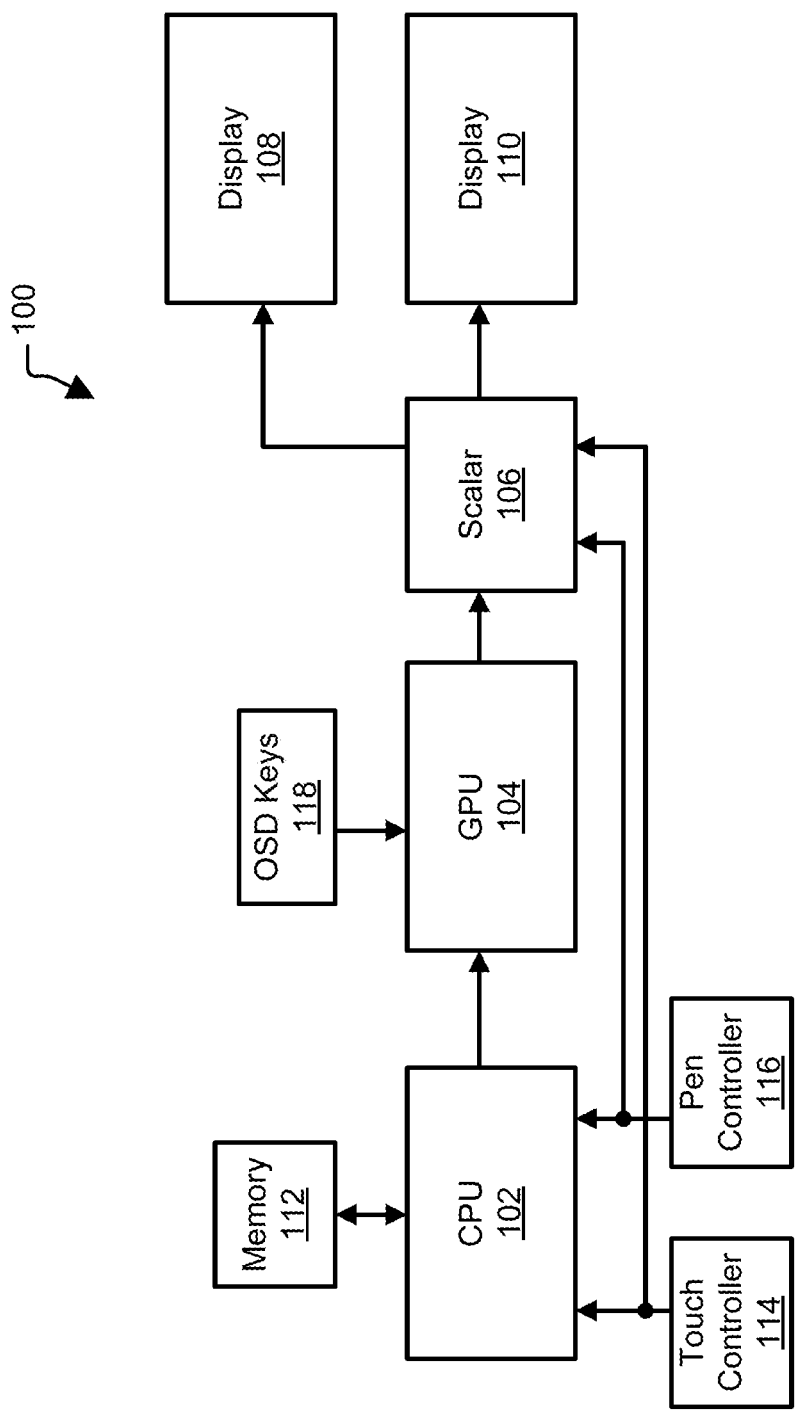
FIG. 1 is a block diagram of a portion of an information handling system according to at least one embodiment of the disclosure.

FIG. 1 shows an information handling system 100 including a central processing unit (CPU) 102, a graphics processing unit (GPU) 104, scalar circuitry 106, displays 108 and 110, a memory 112, a touch controller 114, a pen controller 116, and an on-screen display (OSD) key controller 118. The CPU 102 can include multiple input/output terminals to provide the communication with the memory 112, the GPU 104, the touch controller 114, and the pen controller 116. The GPU 104 can include multiple input/output terminals to provide the communication with the OSD key controller 118, and the scalar circuitry 106. The scalar circuitry 106 can include multiple input/output terminals to provide the communication with the displays 108 and 110, the touch controller, and the pen controller 116.

Figure 2:
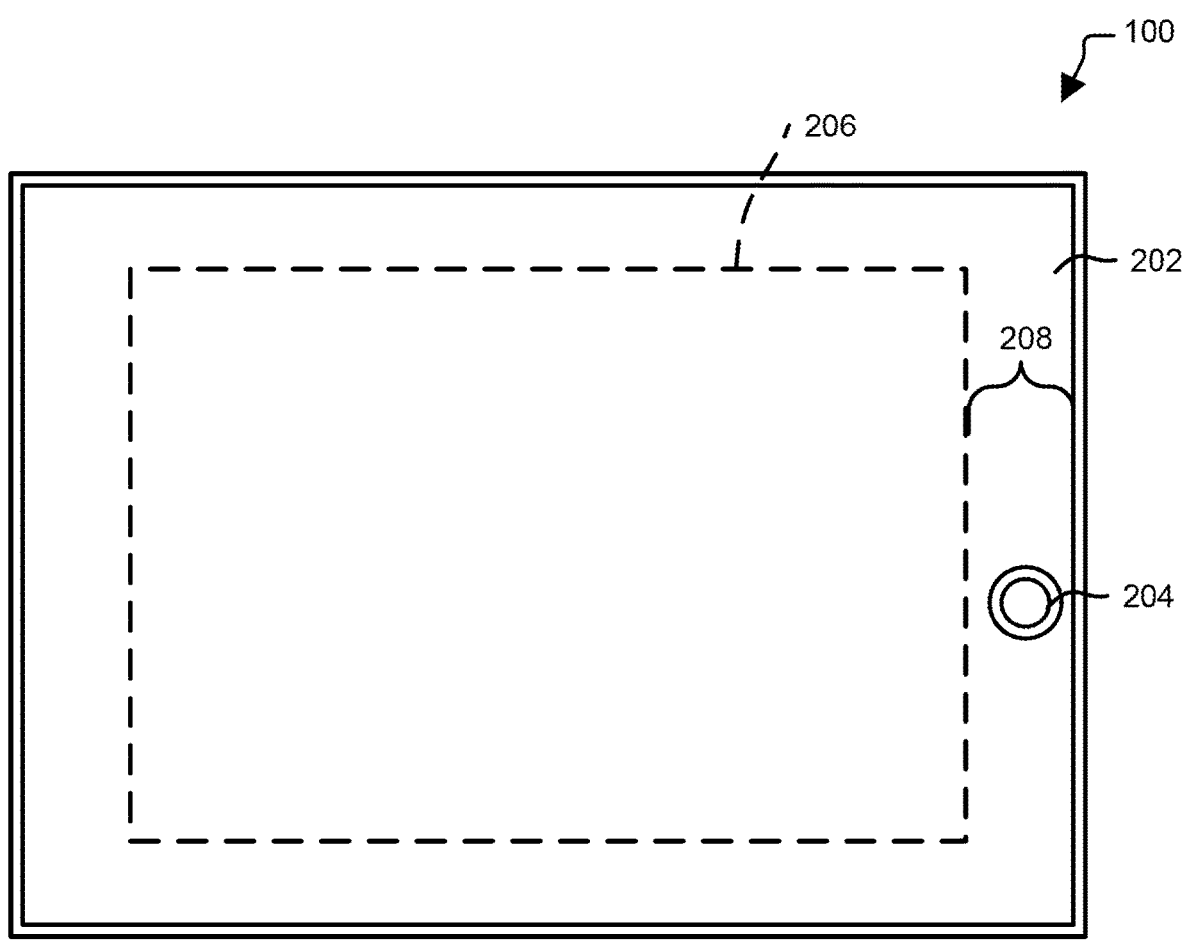
FIGS. 2-4 are diagrams of a display and touch surface of the information handling system according to at least one embodiment of the present disclosure.
Figure 3:
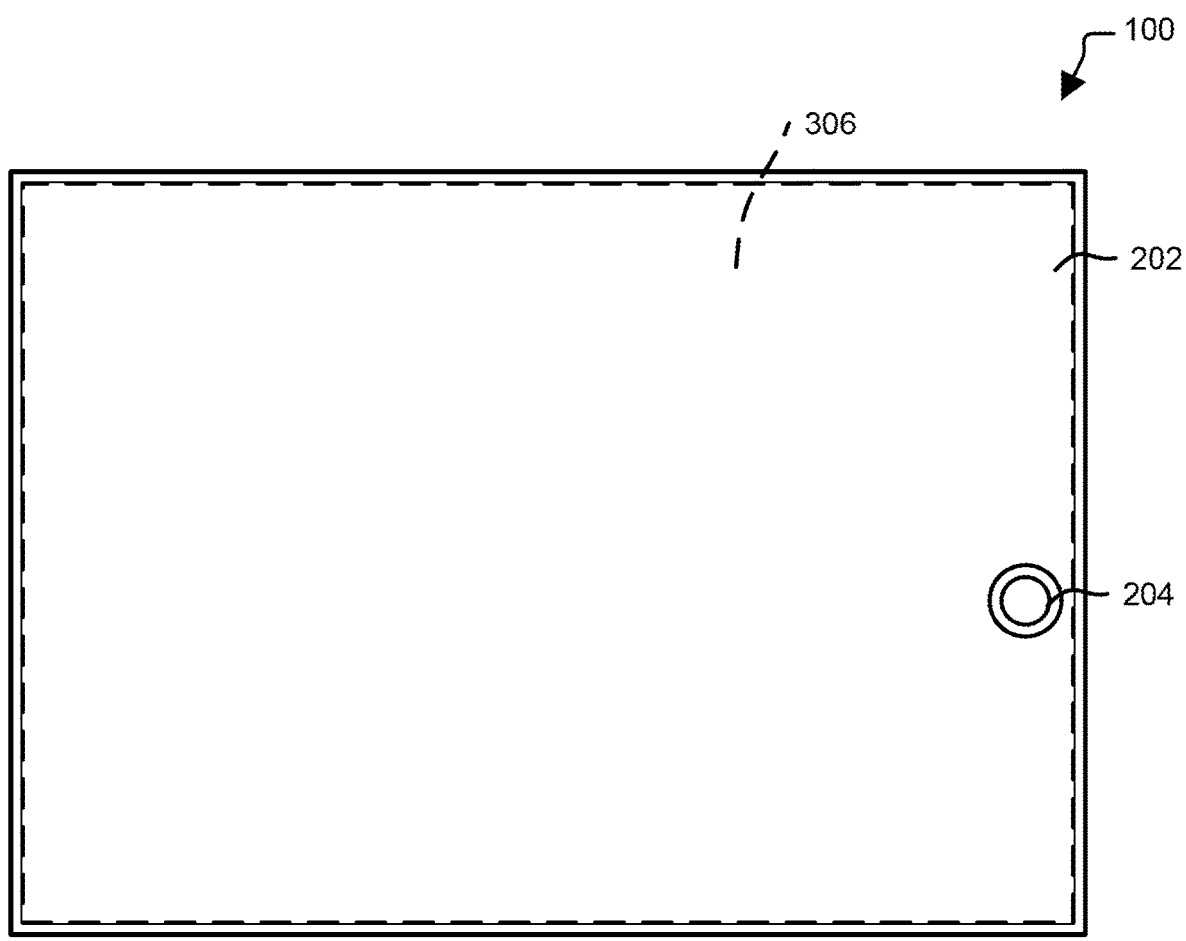
Figure 4:
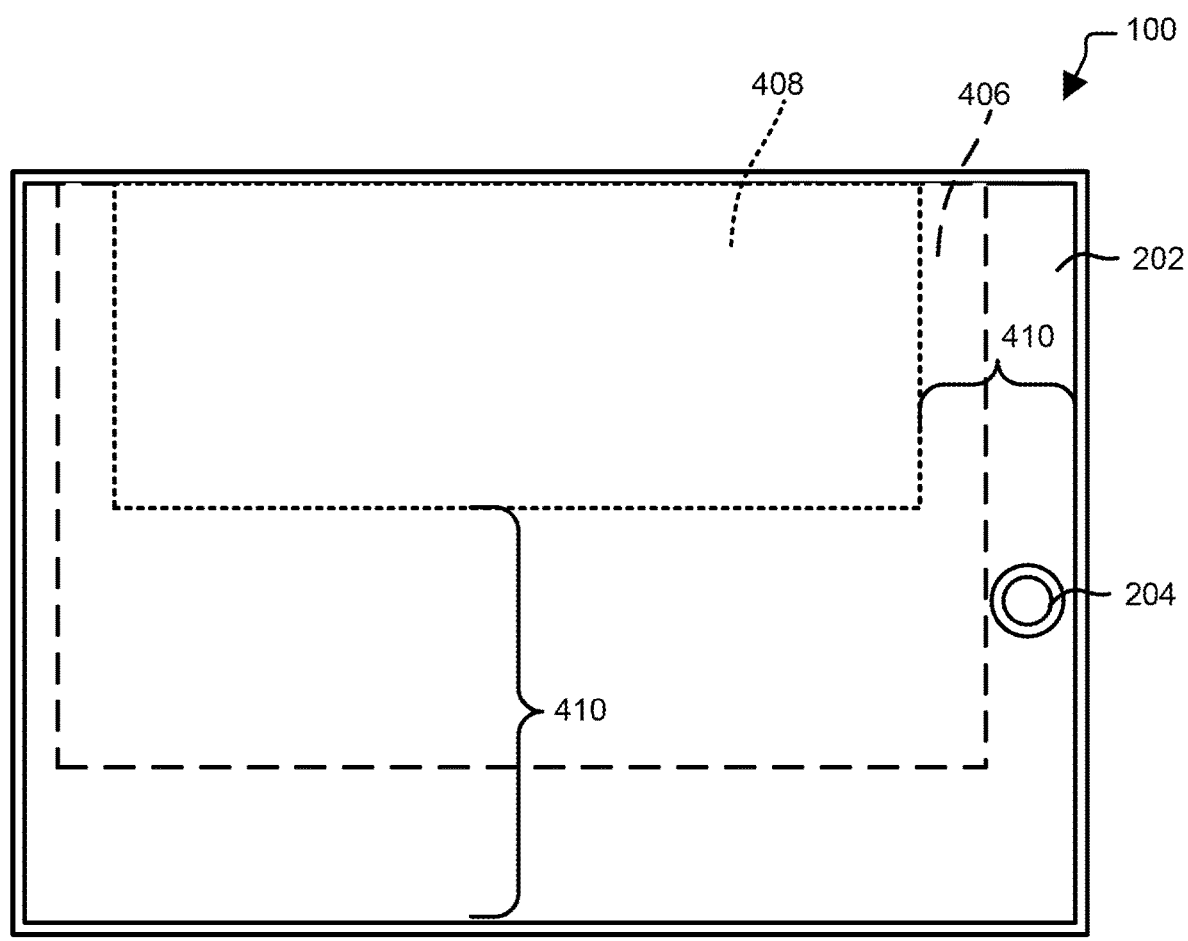

In an embodiment, the touch controller 114 and the pen controller 116 can be implemented within a single controller without varying from the scope of this disclosure. In an embodiment, the information handling system 100 can include only one of the displays 108 and 110 without varying from the scope of this disclosure. In an embodiment, the information handling system 100 can provide a horizontal work surface, such as work surface information handling system 100 of FIGS. 2-4. As shown in FIGS. 2-4, the information handling system 100 includes a screen 202 and a totem 204. The operation of information handling system 100 will be discussed with respect to FIGS. 1-4.

In an embodiment, the screen 202 can be a touch sensitive screen that can receive/detect inputs from a pen device, an individual's finger, the totem 204, or the like. During operation, the touch controller 114 can detect inputs from a finger, and can provide the corresponding inputs to the CPU 102 for further processing. Similarly, the pen controller 116 can detect inputs from a pen device, and can provide the corresponding inputs to the CPU 102. The CPU 102 can then process the inputs and provide instructions for changing/altering a display image to the GPU 104, which in turn can implement these instructions and provide the updated image to one or both of the displays 108 and 110 via the scalar circuitry 106. In an embodiment, the scalar circuitry 106 can be utilized to adjust the display image to a proper aspect ratio for the displays 108 and 110.

As shown in FIG. 2, the screen 202 can include a display area 206 with a border area 208 from the edge of the display area 206 to the edge of the screen 202. In an embodiment, the information handling system 100 can be set a predefined display area, such as display area 206, which can also be a predefined workspace area. In an embodiment, the workspace area is a region of the screen where the touch controller 114 and the pen controller 116 can accept inputs. In this embodiment, the border area 208 can also be set as a predefined ignore area, such that any touches from a pen device or a finger can be ignored by the touch controller 114 and the pen controller 116. While the information handling system 100 is illustrated with a predefined ignore area 208, the information handling system 100 can also be preset without any ignore area, such that touches on the entire screen are accepted by the touch controller 114 and the pen controller 116. In this embodiment, the display and workspace area can be preset to a size of the entire screen 202, such as display and workspace area 306 shown in FIG. 3. In an embodiment, the totem 204 can provide a graphical user interface (GUI) menu that can be displayed and operated on the entire screen 202, such that the totem 204 can operation in both the display and touch area 206 and the ignore area 208.

During operation of the information handling system 100, a user may want to change the workspace area and/or the display area from the predefined workspace and/or display area. The user can select an on-screen display (OSD) menu via a soft button on the display area 206, the totem 204, or the like. In response to this selection, the OSD key controller 118 can provide an OSD menu layout to the GPU 104 for display on the screen 202. An OSD menu can then be provided on the display 206 with a number of options for the user to select, such as define workspace area, define display area, define a single workspace and display area, or the like. The selection or defining of a single workspace and display area can substantially the same as defining either a workspace area or a display area. Thus, for brevity, the selection of different areas for display area and workspace area will be described.

The user can then select define display area from the OSD menu, and in response the CPU 104 can place the information handling system 100 in a define display mode. In an embodiment, the selection can be detected by either the touch controller 114 or the pen controller 116. The user can then utilize either a pen device or a finger to draw a display area, such as display area 406 in FIG. 4. The CPU 102 can receive data identifying the user defined display area 406 from either the touch controller 114 or the pen controller 116, and can then determine whether the user defined display area meets predefined criteria, such as a required aspect ratio for the display 108 or 110. If the user defined display area meets the criteria the new display area 406 can be stored in the memory 112. However, if the user defined display area does not meet the criteria, such as the aspect ratio is not correct, the CPU 102 can GPU 106 can provide a warning message on the screen 202 informing the user of the incorrect user defined display area. The GPU 106 can then provide a correct display area that meets the criteria and a message can be provided asking the user if the corrected display area is acceptable. If the user accepts the corrected display area, it can be stored in the memory 112 as the user defined display area 406.

If the user then decides to select a different are for a workspace area, the user can select define workspace area from the OSD menu, and in response the CPU 104 can place the information handling system 100 in a define workspace mode. In an embodiment, the selection can be detected by either the touch controller 114 or the pen controller 116. The user can then utilize either a pen device or a finger to draw a workspace area, such as workspace area 408 in FIG. 4. In different embodiments, a user may define a desired workspace for different input types, such a mouse cursor, a finger touch, a pen device, a totem, or the like. The CPU 102 can receive data identifying the user defined workspace area 408 from either the touch controller 114 or the pen controller 116, and can then determine whether the user defined workspace area meets predefined criteria, such as a required aspect ratio for the display 108 or 110. If the user defined workspace area 408 meets the criteria the new workspace area 408 can be stored in the memory 112. However, if the user defined workspace area 408 does not meet the criteria, such as the aspect ratio is not correct, the CPU 102 can GPU 106 can provide a warning message on the screen 202 informing the user of the incorrect user defined workspace area 408. The GPU 106 can then provide a correct workspace area that meets the criteria and a message can be provided asking the user if the corrected workspace area is acceptable. If the user accepts the corrected workspace area, it can be stored in the memory 112 as the user defined workspace area 408.

The CPU 102 can then define any area of the screen 202 that is outside of the user defined workspace area 408 as an ignore area 410, such that the touch controller 114 and the pen controller 116 do not accept inputs within this ignore area. However, as stated above, inputs from the totem 204 can accepted both inside the workspace area 408 and in the ignore area 410. In different embodiments, a user may define a desired workspace for different input types, such a mouse cursor, a finger touch, a pen device, a totem, or the like. In this embodiment, the CPU 102 can receive data corresponding to a touch workspace from the touch controller 114 and define the touch workspace area as described above. The CPU 102 can also receive data corresponding to a pen workspace from the pen controller 116 and define the pen workspace area as described above.

In an embodiment, the information handling system 100 may enable multiple users to provide inputs via the screen 202. In this embodiment, the information handling system 100 can provide a virtual machine (VM) instance for each user profile, and each user profile can have a different workspace area that is defined in a similar manner as described above. Thus, in this embodiment, multiple users can edit/change a display image as substantially the same time by providing inputs in their respective workspace areas.

Figure 5:
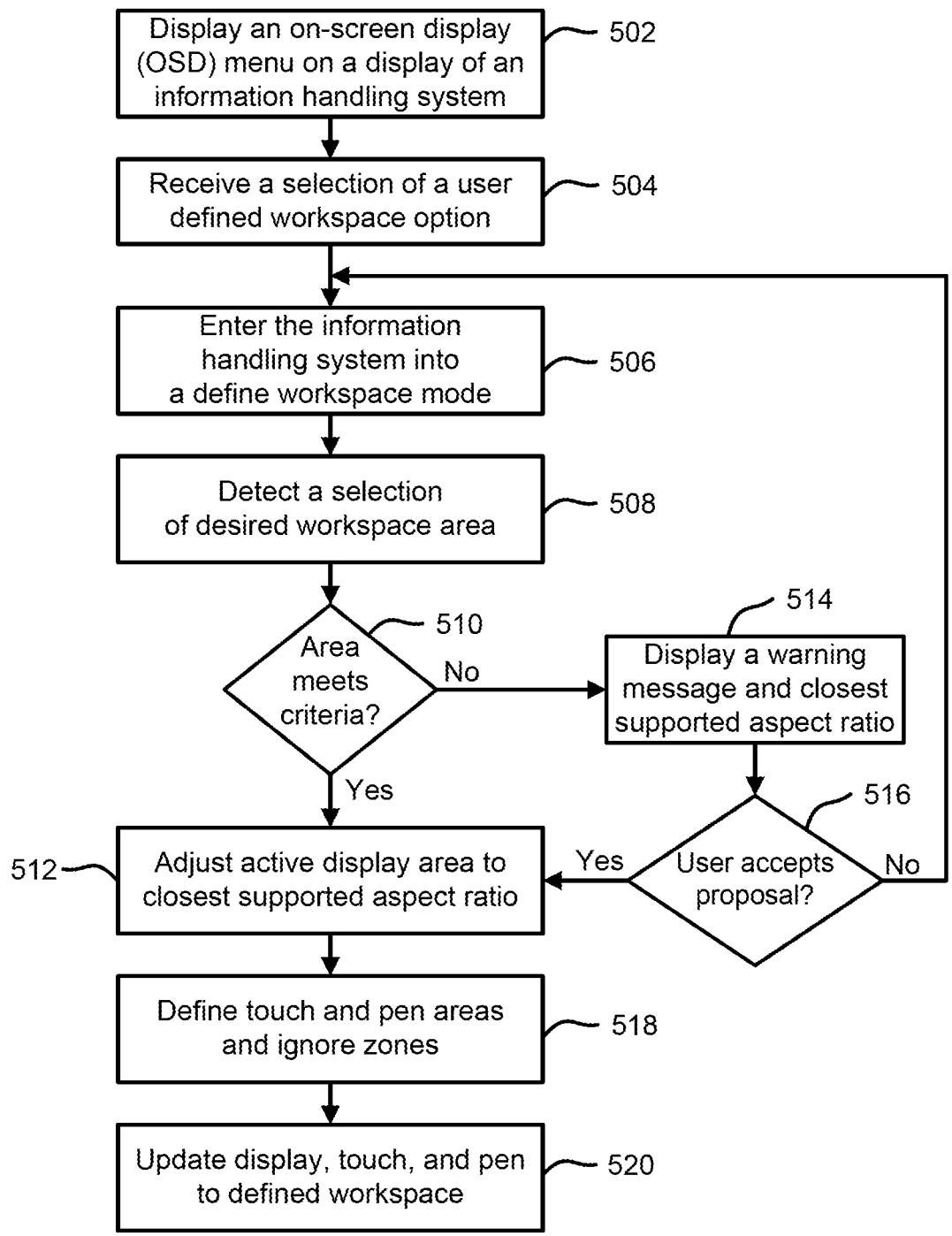
FIG. 5 is a flow diagram of a method for creating a user defined workspace area according to at least one embodiment of the disclosure.

FIG. 5 illustrates a flow diagram of a method 500 for creating a user defined workspace area according to at least one embodiment of the disclosure. At block 502, an OSD menu is displayed on a display of an information handling system. In an embodiment, the OSD menu can be displayed in response to an input from a user via a totem on the screen of the information handling system, selection of a GUI soft button, or the like. A selection of a user defined workspace option in the OSD menu can be received at block 504. In an embodiment, the selection can be detected via a pen controller or a touch controller of the information handling system. At block 506, the information handling system is entered into a define workspace mode. In an embodiment, an entire screen of the information handling system is enabled to receive inputs during the define workspace mode.

A selection of a desired workspace area is detected at block 508. At block 510, a determination is made whether the desired workspace area meets criteria of the information handling system, such as a minimum aspect ratio for the display screen. If the desired workspace area meets the criteria, an active display area is adjusted to a closest supports aspect ratio at block 512. However, if the desired workspace area does not meet the criteria, a warning message is provided on the screen and a closest supported aspect ratio is displayed at block 514. At block 516, a determination is made whether the user accepts the proposed area. If the user does not accept the proposed area, the flow continues as stated above at block 506. If the user does accept the proposed area, the flow continues as stated above at block 512. At block 518, a touch/pen area and an ignore area are defined based on the user defined workspace area. In an embodiment, the touch area and the pen area can be defined as separate portions of the user defined workspace. A display area, a touch area, and pen area are updated to the user defined workspace at block 520.

Figure 6:
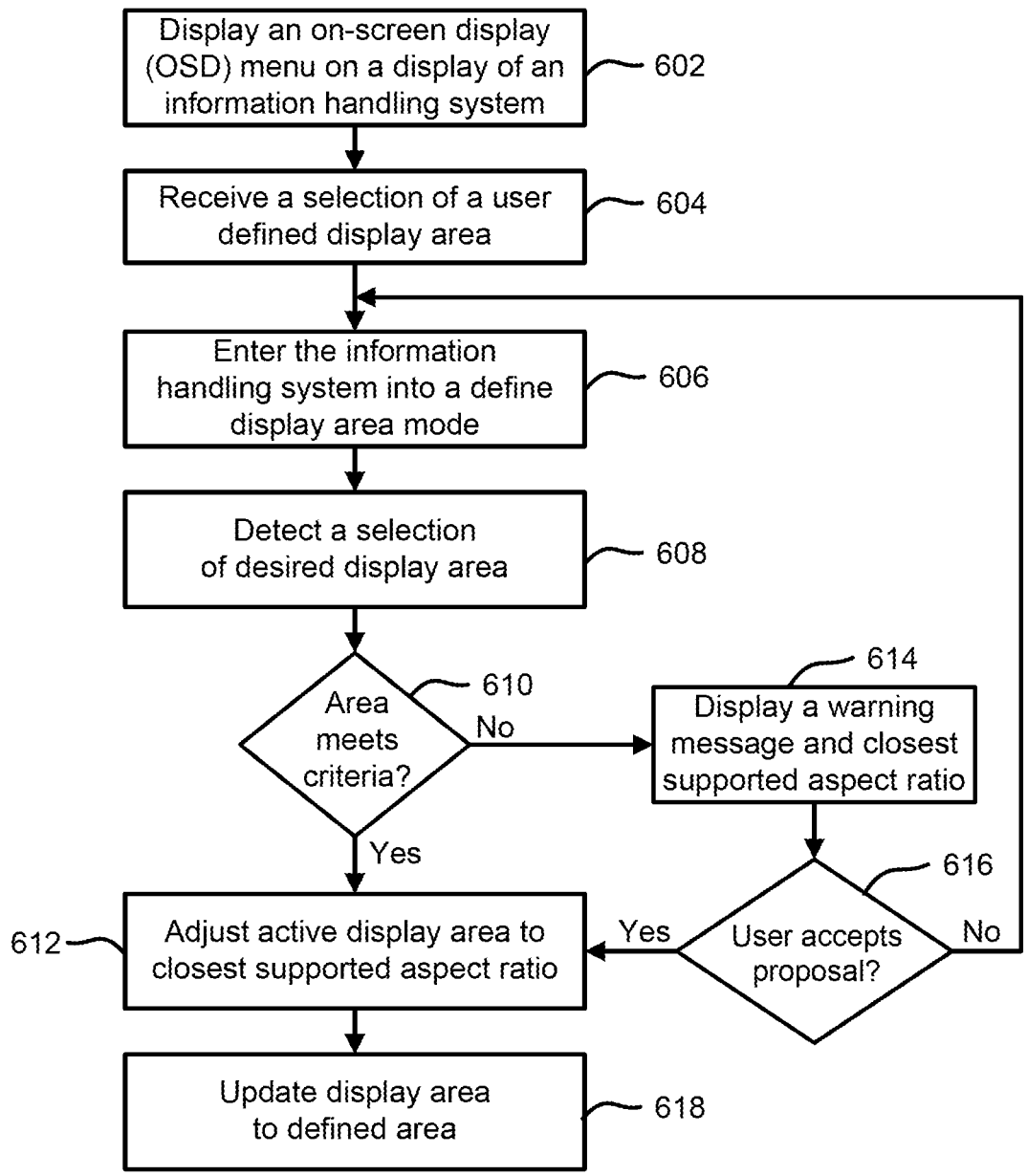
FIG. 6 is a flow diagram of a method for creating a user defined display area according to at least one embodiment of the disclosure.

FIG. 6 illustrates a flow diagram of a method 600 for creating a user defined display area according to at least one embodiment of the disclosure. At block 602, an OSD menu is displayed on a display of an information handling system. In an embodiment, the OSD menu can be displayed in response to an input from a user via a totem on the screen of the information handling system, selection of a GUI soft button, or the like. A selection of a user defined display option in the OSD menu can be received at block 604. In an embodiment, the selection can be detected via a pen controller or a touch controller of the information handling system. At block 606, the information handling system is entered into a define display mode. In an embodiment, an entire screen of the information handling system is enabled to receive inputs during the define display mode.

A selection of a desired display area is detected at block 608. In an embodiment, the user can select the desired display area by drawing a shape, such as a square or rectangle, on the screen of the information handling system. At block 610, a determination is made whether the desired display area meets criteria of the information handling system, such as a minimum aspect ratio for the display screen. If the desired display area meets the criteria, an active display area is adjusted to a closest supports aspect ratio at block 612. However, if the desired display area does not meet the criteria, a warning message is provided on the screen and a closest supported aspect ratio is displayed at block 614. At block 616, a determination is made whether the user accepts the proposed area. If the user does not accept the proposed area, the flow continues as stated above at block 606. If the user does accept the proposed area, the flow continues as stated above at block 612. At block 618, a display area is updated based on the user defined display area.

Figure 7:
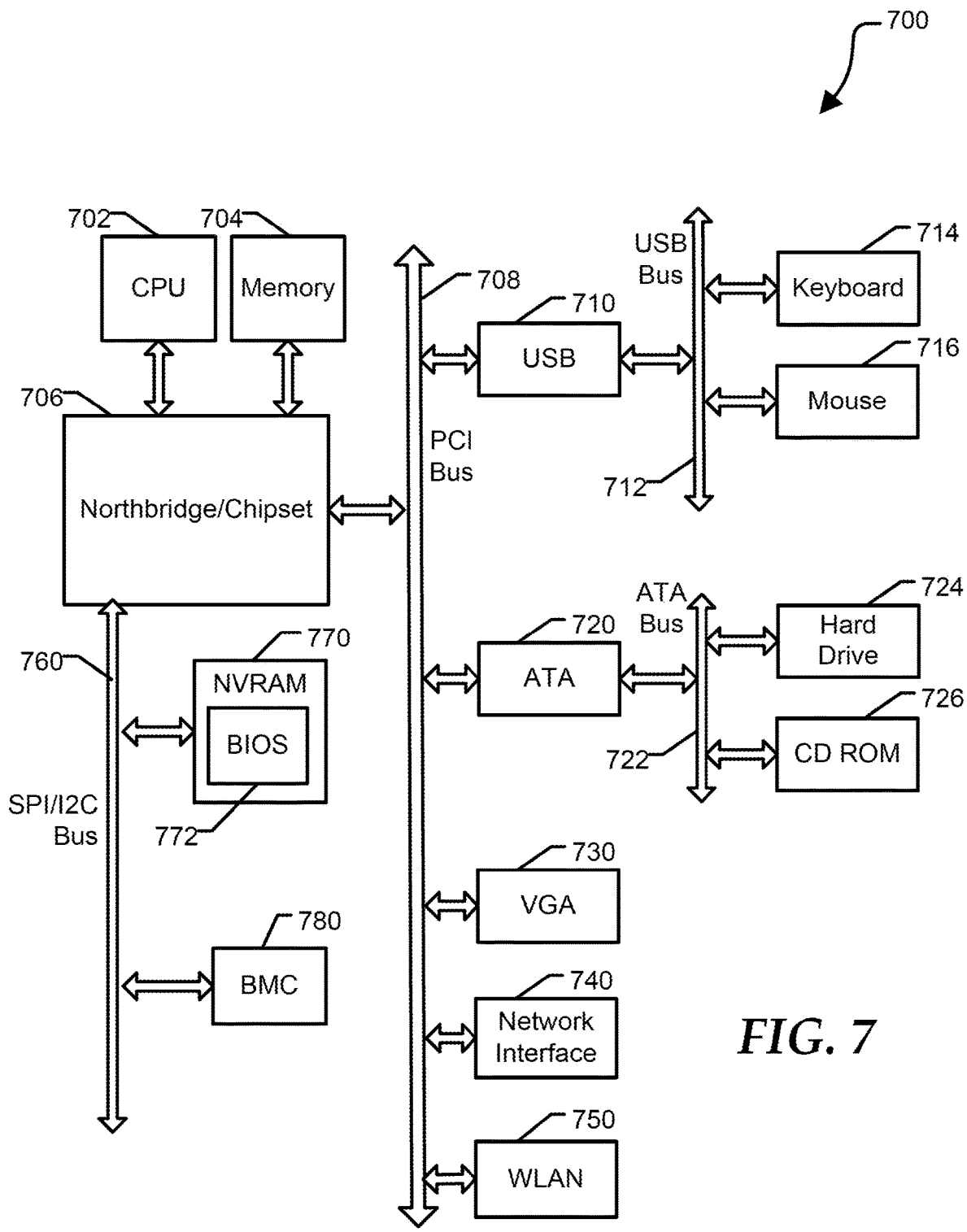
FIG. 7 is a block diagram of a general information handling system according to an embodiment of the present disclosure.

FIG. 7 illustrates a general information handling system 700 including a processor 702, a memory 704, a northbridge/chipset 706, a PCI bus 708, a universal serial bus (USB) controller 710, a USB 712, a keyboard device controller 714, a mouse device controller 716, a configuration an ATA bus controller 720, an ATA bus 722, a hard drive device controller 724, a compact disk read only memory (CD ROM) device controller 726, a video graphics array (VGA) device controller 730, a network interface controller (NIC) 740, a wireless local area network (WLAN) controller 750, a serial peripheral interface (SPI) bus 760, a NVRAM 770 for storing BIOS 772, and a baseboard management controller (BMC) 780. BMC 780 can be referred to as a service processor or embedded controller (EC). Capabilities and functions provided by BMC 780 can vary considerably based on the type of information handling system. For example, the term baseboard management system is often used to describe an embedded processor included at a server, while an embedded controller is more likely to be found in a consumer-level device. As disclosed herein, BMC 780 represents a processing device different from CPU 702, which provides various management functions for information handling system 700. For example, an embedded controller may be responsible for power management, cooling management, and the like. An embedded controller included at a data storage system can be referred to as a storage enclosure processor.

For purpose of this disclosure information handling system 700 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 700 can include processing resources for executing machine-executable code, such as CPU 702, a programmable logic array (PLA), an embedded device such as a System-on-a-Chip (SoC), or other control logic hardware. Information handling system 700 can also include one or more computer-readable medium for storing machine-executable code, such as software or data.

System 700 can include additional processors that are configured to provide localized or specific control functions, such as a battery management controller. Bus 760 can include one or more busses, including a SPI bus, an I2C bus, a system management bus (SMBUS), a power management bus (PMBUS), and the like. BMC 780 can be configured to provide out-of-band access to devices at information handling system 700. As used herein, out-of-band access herein refers to operations performed prior to execution of BIOS 772 by processor 702 to initialize operation of system 700.

BIOS 772 can be referred to as a firmware image, and the term BIOS is herein used interchangeably with the term firmware image, or simply firmware. BIOS 772 includes instructions executable by CPU 702 to initialize and test the hardware components of system 700, and to load a boot loader or an operating system (OS) from a mass storage device. BIOS 772 additionally provides an abstraction layer for the hardware, such as a consistent way for application programs and operating systems to interact with the keyboard, display, and other input/output devices. When power is first applied to information handling system 700, the system begins a sequence of initialization procedures. During the initialization sequence, also referred to as a boot sequence, components of system 700 are configured and enabled for operation, and device drivers can be installed. Device drivers provide an interface through which other components of the system 700 can communicate with a corresponding device.

Information handling system 700 can include additional components and additional busses, not shown for clarity. For example, system 700 can include multiple processor cores, audio devices, and the like. While a particular arrangement of bus technologies and interconnections is illustrated for the purpose of example, one of skill will appreciate that the techniques disclosed herein are applicable to other system architectures. System 700 can include multiple CPUs and redundant bus controllers. One or more components can be integrated together. For example, portions of northbridge/ chipset 706 can be integrated within CPU 702. Additional components of information handling system 700 can include one or more storage devices that can store machine-executable code, one or more communications ports for communicating with external devices, and various input and output (I/O) devices, such as a keyboard, a mouse, and a video display. An example of information handling system 700 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 700 can include a set of instructions that can be executed to cause the information handling system to perform any one or more of the methods or computer based functions disclosed herein. The information handling system 700 may operate as a standalone device or may be connected to other computer systems or peripheral devices, such as by a network.

In a networked deployment, the information handling system 700 may operate in the capacity of a server or as a client user computer in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single information handling system 700 is illustrated, the term "system" shall also be taken to include any collection of systems or sub-systems that individually or jointly execute a set, or multiple sets, of instructions to perform one or more computer functions.

The information handling system 700 can include a disk drive unit and may include a computer-readable medium, not shown in FIG. 7, in which one or more sets of instructions, such as software, can be embedded. Further, the instructions may embody one or more of the methods or logic as described herein. In a particular embodiment, the instructions may reside completely, or at least partially, within system memory 704 or another memory included at system 700, and/or within the processor 702 during execution by the information handling system 700. The system memory 704 and the processor 702 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a memory to store a display area and a workspace area of a screen of the information handling system; and
   a processor in communication with the memory, the processor to receive a selection of user defined workspace area option, to enter into a user defined workspace mode, to receive a desired workspace area, wherein the desired workspace area is identified based on a workspace area drawn on the screen, to update the workspace area in the memory from a predefined workspace area to the desired workspace area, wherein inputs on the screen in the desired workspace area from a pen device or a finger are accepted, and to define an ignore area on the screen as an area of the screen outside the workspace area, wherein inputs on the screen in the ignore area from a pen device or a finger are not accepted.

2. The information handling system of claim 1, further comprising:
a totem to communicate with the processor, the totem to provide inputs to the processor while the totem is located within the workspace area, and while the totem is located within the ignore area.

3. The information handling system of claim 1, the processor to determine whether the desired workspace area meets criteria prior to the workspace area being updated, and to update the workspace area in the memory from the predefined workspace area to the desired workspace area in response to the desired workspace area having met the criteria.

4. The information handling system of claim 3, the processor to provide a warning message and a proposed workspace area in response to the desired workspace not meeting the criteria.

5. The information handling system of claim 1, wherein the desired workspace area is for a further input type selected from a group including: a totem and a mouse cursor.

6. The information handling system of claim 1, the processor to receive a selection of user defined display area option, to enter into a user define display mode, to receive a desired display area, and to update the display area in the memory from a predefined display area to the desired display area.

7. A method comprising:
receiving, at a processor of an information handling system, a selection of user defined workspace area option on a screen of the information handling system;
entering the processor into a user defined workspace mode;
receiving a desired workspace area, wherein the desired workspace area is identified based on a workspace area drawn on the screen; and
updating, in a memory of the information handling system, a workspace area from a predefined workspace area to the desired workspace area, wherein inputs on the screen in the desired workspace area from a pen device or a finger are accepted; and
defining an ignore area on the screen of the information handling system as an area of the screen outside the workspace area, wherein inputs on the screen in the ignore area from a pen device or a finger are not accepted.

8. The method of claim 7, further comprising:
accepting inputs from a totem of the information handling system while the totem is located within the workspace area and while the totem is located within the ignore area.

9. The method of claim 7, further comprising:
determining whether the desired workspace area meets criteria prior to the workspace area being updated;
in response to the desired workspace area having met the criteria, updating the workspace area in the memory from the predefined workspace area to the desired workspace area.

10. The method of claim 9, further comprising:
in response to the desired workspace not meeting the criteria:
providing a warning message; and
providing a proposed workspace area that meets the criteria.

11. The method of claim 7, further comprising:
updating a display area on the screen to a size of the desired workspace area.

12. The method of claim 7, further comprising:
receiving a selection of user defined display area option;
entering into a user define display mode;
receiving a desired display area; and
updating, in the memory, a display area on the screen from a predefined display area to the desired display area.

13. A method comprising:
receiving, at a processor of an information handling system, a selection of user defined display area option;
entering the processor into a user define display mode;
receiving a desired display area;
updating, in a memory of the information handling system, a display area from a predefined display area to the desired display area;
receiving a selection of a user defined workspace area option;
entering the processor into a user defined workspace area mode;
receiving a first desired workspace area, wherein the first desired workspace area is identified based on a workspace area drawn on the screen, wherein the first desired workspace area is an area where inputs from a pen device are accepted;
receiving a second desired workspace area, wherein the second desired workspace area is an area where inputs from a finger are accepted; and
updating, in the memory, a workspace area from a predefined display area to the first workspace area and the second workspace area; and
defining an ignore area on a screen of the information handling system as an area of the screen outside the first and second desired workspace areas, wherein inputs on the screen in the ignore area from a pen device or a finger are not accepted.

14. The method of claim 13, further comprising:
accepting inputs from a totem of the information handling system while the totem is located within the workspace area and while the totem is located within the ignore area.

15. The method of claim 13, further comprising:
determining whether the desired display area meets criteria prior to the display area being updated;
in response to the desired display area having met the criteria, updating the display area in the memory from the predefined display area to the desired workspace area.

16. The method of claim 15, further comprising:
in response to the desired display not meeting the criteria:
providing a warning message; and
providing a proposed display area that meets the criteria.

17. The method of claim 13, further comprising:
determining whether the first desired workspace area and the second desired workspace area meet criteria prior to the workspace area being updated;

in response to the first desired workspace area having met the criteria, updating the workspace area in the memory from the predefined workspace area to the first desired workspace area and the second desired workspace area.

\* \* \* \* \*